United States Patent Office 3,689,427
Patented Sept. 5, 1972

3,689,427
POLYMERIZABLE MIXTURES COMPRISING A BIVALENT METAL SALT OF AN ACRYLATE- OR METHACRYLATE-PHTHALATE ESTER OF AN ALKYLENE GLYCOL
Hideaki Matsuda, Marugame, Takanori Okamoto, Nakatado, and Hidemi Dohi, Marugame, Japan, assignors to Okura Kogyo Kabushiki Kaisha, Kagawa-ken, Japan
No Drawing. Filed Aug. 18, 1970, Ser. No. 64,808
Claims priority, application Japan, Aug. 27, 1969, 44/68,112
Int. Cl. C08d 3/04; C08f 3/66
U.S. Cl. 252—188.3       11 Claims

ABSTRACT OF THE DISCLOSURE

A polymerizable substance is prepared by first making a bivalent metal salt of a compound having the structural formula

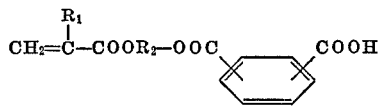

wherein $R_1$ is hydrogen or methyl and $R_2$ is an alkylene group which may or may not be halogenated, and then mixing said salt with another monomer capable of copolymerization with it. The polymerizable substance so obtained can be used in paints or as a molding material or adhesive.

---

The present invention relates to a process for the preparation of a polymerizable substance having a metallic ionic bond. More particularly, the present invention relates to a process for the preparation of a polymerizable substance characterized by reacting a compound represented by the structural formula:

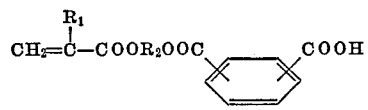

wherein $R_1$ represents hydrogen or methyl group and $R_2$ denotes an alkylene group such as ethylene group, propylene group, or a halogenated alkylene group such as chloropropylene, with an oxide or hydroxide of a bivalent metal in an inert solvent, such as benzene or toluene, and mixing the metallic salt which is obtained by removing the solvent after the reaction, with a monomer having the ability to copolymerize with said metallic salt.

The term "metallic ionic bond" as used hereafter means the bond that is the result of the ionic attraction between the metallic ion and the ionized carboxylic acid group.

It is known that organic polymers which are bridged by metallic ionic bonds have various superior properties. Namely, the polymers have heat-resisting property, shock resistance, tenacity and other superior properties. In order to obtain such, there have been proposed two processes. One of the two processes is a process in which, for instance, first a linear polymer having a functional group capable of forming an ionic bond, such as a carboxylic acid group at a side chain is prepared, then the metallic ionic bond is introduced. The other process is such that polymerizable monomer having the metallic ionic bond is first prepared, and then said monomer is copolymerized with the other polymerizable monomer. In general, the former process has been more widely employed. However, there are problems in introducing the metal. Namely, in order to introduce the metal uniformly in the polymer, it is necessary to have a highly efficient mixing operation and in order to eliminate the reaction by-product having low molecular weight, produced by the neutralization reaction generally high evaporation temperatures are employed. Also, there is a limit to the quantity of the metal to be introduced. The latter process is regarded as an advantageous process since there is no problem as encountered in the former process due to the fact that the metallic ionic bond is already present before polymerization.

As a result of the various examinations of the process for the preparation of polymer substances having metallic ionic bonds from the foregoing standpoint, the inventors have incented the present process. Namely, the inventors have found that a raw material composition for obtaining a polymer having superior properties can be prepared by reacting the compound which is generally represented by the general structural formula with an oxide or hydroxide, of a bivalent metal, and mixing the resulting salt, after removal of water and solvent, with a monomer capable of copolymerization therewith.

The compound represented by the structural formula can be easily synthesized from a basic raw material which is produced at a low cost on an industrial scale. In case $R_1$ is hydrogen, it is an acrylic acid derivative and if $R_1$ is methyl group, it is a methacrylic acid derivative. Now the gist of the process of synthesis of the structural formula will be described with reference to the case in which $R_2$ is the ethylene group. The end product can be prepared by effecting a half esterification reaction of hydroxyethyl acrylate or hydroxyethyl methacrylate with phthalic anhydride or phthalic acid, ortho, meta or para. In this case, it is advantageous to use phthalic anhydride as the process is not accompanied with dehydration and yet the hafl esterification can be easily carried out. Also, in this case, there is no restriction with respect to quantitative relation between the hydroxyl compound and acid anhydride, but for the acid anhydride, the end product can be easily prepared by using a slightly excessive quantity of hydroxyl compound, namely, 1.2 to 1.5 mol of hydroxyl compound for 1 mol of acid anhydride since such use of the compound accelerates the reaction. As described in the foregoing passage, there is a case in which excessive unreacted hydroxyl compound exists in the reaction product depending upon the quantitative relation of the reaction system to be applied, but it may be removed after the reaction is carried out, or it may be used in the succeeding neutralization reaction as it is instead of removing it because it has a polymerizable double bond in itself. In the structural formula, $R_2$ represents a glycol residual group, namely, an alkylene group or a halo-carrying alkylene group, and the length of chain is not particularly limited, but it is preferable to have a relatively shorter length of chain, $R_2$ can be such a group as

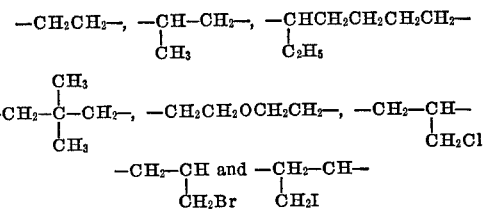

No more than one halogen may be present in the $R_2$ group.

Now, the compound which is represented by the structural formula thus obtained is dissolved in an inert solvent such as benzene and toluene and the like, and is agitated at a low temperature, or room temperature or high temperature, and a fixed quantity of oxide or hydroxide of bivalent metal is added in suitable quantity while the agitation is carried out to effect the neutralization reaction. The metal of the oxide or hydroxide of bivalent metal which is employed in the reaction, for instance, can be magnesium, calcium, zinc, cadmium, barium, lead and so on. Also, the quantitative relation of the oxide or hydroxide of bivalent metal and carboxylic acid group is not particularly limited, but 0.5 to 1.0 equivalent of oxide or hydroxide of bivalent metal for one equivalent of carboxylic acid group is preferable. As described above, it is highly significant that an industrially low cost and advantageous metal oxide or hydroxide is employed as the raw material for the preparation of metallic salt. As the solvent, there is no particular requirement as long as it is an inert solvent, but it is preferable that such material as benzene, toluene, acetone or methylethylketone, which is relatively easy to remove after the reaction is completed, be used. In most cases, the neutralization reaction progresses at a considerable speed at a low temperature or room temperature, but in order to raise the speed of the reaction further a high temperature (preferably 60-80° C.) may be advantageous. The water which is produced by the reaction can be removed with the solvent at the time of removal of the solvent after the reaction is completed. Also, in case the solvent is benzene, the water can be removed out of the system by reflux after the reaction or during the reaction.

The metallic salt of the acid of the structural formula is a novel compound. It may be obtained in varying viscosities up to a solid substance depending on the kind of the metal or the quantitative relation of carboxylic acid group and metallic oxide and hydroxide. The metallic salt may be polymerized singly, but it is far more advantageous to mix it with another polymerizable monomer not only from the standpoint of the operation but also from the physical property of the polymer to be obtained.

The copolymerizable monomers that can be employed in the process are, for instance, styrene, methylmethacrylate, ethylmethacrylate, hydroxyethylmethacrylate, propylmethacrylate, butyl methacrylate, methylacrylate, ethylacrylate, divinylbenzene, ethylene glycol dimethacrylate, vinyl acetate and mixtures thereof.

The object of the present invention is achieved by mixing a copolymerizable monomer with said metallic salt.

The polymerization reaction proceeds at room temperature or a high temperature by adding polymerization catalyst or high temperatures alone will suffice. The mixing ratio of the metallic salt to copolymerizable monomer is about 1:1 to about 1:20 by weight but if the weight quantities of both substances are substantially equal, a polymer substance having superior properties can be obtained. Namely, the polymer obtained is of the heat resistant type and has high tenacity and is superior in shock resistance and adhesive property. It is apparent that the polymer prepared is one in which bridging is carried out by metallic ionic bonds.

On the other hand, as a copolymerizable monomer, a monomer having two double bonds in one molecule such as divinyl benzene or a monomer having more than two double bonds may be employed. In this case, the polymer to be prepared is considered as forming a net polymer by both covalent bonds and metallic ionic bonds.

The polymerizable substance of the present invention has many uses such as molding material, paint, adhesives and others.

The present invention is now described concretely with a reference example and applied examples.

REFERENCE EXAMPLE: (PREPARATION OF EMP)

148.1 g. of phthalic anhydride, 156.2 g. of 2-hydroxyethylmethacrylate, and 165 mg. of hydroquinone as polymerization inhibitor and 595 mg. of N,N-dimethylbenzyl amine are placed in a three-necked flask with 500 cc. capacity and provided with an air condenser, thermometer, and agitation means, and when the mixture is agitated for four hours at a temperature of 90° C., quantitatively ethyleneglycolmethacrylate phthalate (hereinafter referred to as EMP) is prepared. The reason for employing 2-hydroxyethylmethacrylate in more than a quantity theoretically calculated is that it minimizes the amount of unreacted phthalic anhydride. The end product is a light yellow transparent liquid and its acid value is 187.0 (theoretical value is 184.6).

APPLIED EXAMPLE 1: (MG SALT OF EMP)

122 g. of EMP and 200 g. of benzene are placed in a four-necked flask provided with a water content separating means, thermometer, and agitation means, and while vigorously agitating, 8.06 g. of magnesium oxide powder is added. Immediately thereafter, the benzene is refluxed, and the agitation is continued while heat is applied. Water amounting to 69% of theoretical quantity is separated after the elapse of 5 hours, and the benzene reflux liquid becomes transparent. After the unreacted magnesium oxide is filtered out and the benzene is removed, a high viscosity liquid having magnesium salt of EMP as its major component is prepared.

APPLIED EXAMPLE 2: (CD SALT OF EMP)

30.5 g. of EMP, 60 g. of benzene are placed in a flask having the same means as in the case of Applied Example 1, and while the mixture is sufficiently agitated at room temperature, 6.42 g. of cadmium oxide powder is added. The reaction is accompanied with slight heat generation. After the heat generation is over, and when the benzene is refluxed, water of 85% of theoretical quantity is separated after the elapse of 2.5 hours, and the benzene reflux liquid, becomes transparent. Thereafter, the benzene is removed; the cadmium salt of EMP in the form of a light yellow transparent glass is prepared almost quantitatively.

APPLIED EXAMPLE 3: (BA SALT OF EMP)

30.5 g. of EMP and 60 g. of benzene are placed in a flask having the same means as in the case of Applied Example 1, and while the mixture is sufficiently agitated at a room temperature, 7.67 g. of barium oxide powder is added gradually to the mixture. The reaction is accompanied with considerable heat generation. After the heat generation is cover, the benzene is refluxed, and water of theoretical quantity is separated. Then, when the benzene is removed, the barium salt of EMP in the form of a light brown color glass is prepared almost quantitatively.

APPLIED EXAMPLE 4: (PB SALT OF EMP)

30.5 g. of EMP and 60 g. of benzene are placed in a flask having the same means as in the case of the Applied Example 1, and while the mixture is sufficiently agitated, 11.2 g. of powder of lead monoxide is added. The reaction is accompanied with considerable heat generation, and it reaches a temperature of 34° C. after the elapse of several minutes. After the heat generation is over, the benzene is refluxed, and then water of 89% of theoretical quantity is separated and the system becomes transparent. Thereafter, when the benzene is removed, the lead salt of EMP in the form of a light yellow high viscosity liquid is prepared almost quantitatively.

APPLIED EXAMPLE 5: (CD SALT OF EAP)

28.8 g. of ethyleneglycolacrylatephthalate (hereinafter referred to as EAP), which is prepared by the same operation as in the case of the Reference Example from 2-hydroxylethylacrylate and phthalic anhydride, and 60 g. of benzene are placed in a flask having the same means as in the case of the Applied Example 1, and while the mixture is sufficiently agitated, 7.32 g. of powder of cadmium hydroxide is added to the mixture. The benzene is refluxed, and after the product water is separated, and the benzene is removed, the cadmium salt of EAP in the form of a light yellow glass is prepared almost quantitatively.

APPLIED EXAMPLE 6: (BULK POLYMERIZATION OF A POLYMERIZABLE SUBSTANCE INCLUDING AN EMP OR EAP SALT)

A metallic salt of EMP or EAP, prepared as in Examples 1 through 5 and methylmethacrylate, or a 1:1 by weight mixture of methylmethacrylate and styrene, are mixed at a ratio of 1:1 by weight, and to the mixture is added 0.4 weight percent of a 60% dimethylphthalate solution of methylethyl ketoneperoxide and the mixture is polymerized for several hours at a temperature of 80° C. As a result, a polymer having superior mechanical strength, heat resisting property, adhesive property and chemical reagent-resisting property is obtained.

More specifically, the mixture of EMP magnesium salt and methylmethacrylate by weight ratio 1:1 which is polymerized has heat distortion temperature 139° C. (ASTM D 648 fiber stress 18.56 kg./cm.$^2$), Rockwell hardness 110 (ASTM D 785 M scale), compression strength 1600 kg./cm.$^2$ (ASTM D 695), tensile strength 895 kg./cm.$^2$ (ASTM D 638). The polymer has a strong adhesive property when prepared by bulk polymerization between metal plates such as iron and aluminum. The polymer shows thermal stability which is superior to that of a conventional thermosetting resin such as polyester as shown by thermal analysis.

While the weight ratio of the two monomers in Applied Example 6 is 1:1, said ratio is not critical and can generally vary from 1:1 to metal salt monomer to other monomer to 1:20.

Other copolymerizable monomers such as styrene, ethylmethacrylate, hydroxyethylmethacrylate, propylmethacrylate, butyl methacrylate, methylacrylate, ethylacrylate, divinylbenzene, ethylene glycol dimethacrylate, vinyl acetate and mixtures thereof yield similar results in the process of this example.

What is claimed is:

1. A polymerizable mixture consisting essentially of a bivalent metal salt of a compound represented by the formula

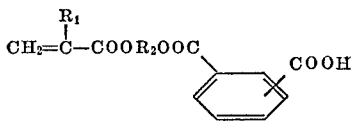

wherein $R_1$ is hydrogen or methyl and $R_2$ is an alkylene group or a monohaloalkylene group, and a polymerizable ethylenically unsaturated compound, the weight ratio of said metal salt to said polymerizable compound being from about 1:1 to about 1:20.

2. The polymerizable mixture of claim 1 wherein said polymerizable ethylenically unsaturated compound is selected from the group consisting of styrene, methylmethacrylate, ethylmethacrylate, hydroxyethylmethacrylate, propylmethacrylate, butylmethacrylate, methylacrylate, ethylacrylate, vinyl acetate, divinylbenzene, ethylene glycol dimethacrylate and mixtures thereof.

3. The polymerizable mixture of claim 1 wherein the weight ratio of polymerizable metal salt to said polymerizable ethylenically unsaturated compound is about 1:1.

4. The polymerizable mixture of claim 1 wherein $R_2$ is selected from the group consisting of

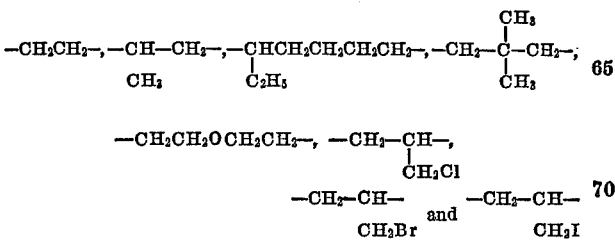

5. The polymerizable mixture of claim 1 wherein the bivalent metal is selected from the group consisting of magnesium, calcium, cadmium, zinc, barium and lead.

6. The polymerizable mixture of claim 1 wherein the metal salt is the magnesium salt of ethyleneglycolmethacrylatephthalate and said polymerizable ethylenically unsaturated compound is methylmethacrylate.

7. The polymerizable mixture of claim 1 wherein said polymerizable ethylenically unsaturated compound is an equal weight mixture of styrene and methylmethacrylate.

8. The polymerizable mixture of claim 7 wherein the weight ratio of polymerizable metal salt to said polymerizable ethylenically unsaturated compound is about 1:1.

9. The polymerizable mixture of claim 7 wherein the bivalent metal is selected from the group consisting of magnesium, calcium, cadmium, zinc, barium and lead.

10. A polymerizable mixture consisting essentially of a bivalent metal salt of a compound represented by the formula

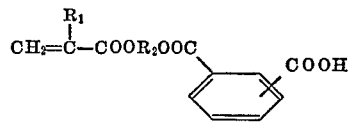

wherein $R_1$ is hydrogen or methyl, $R_2$ is selected from the group consisting of

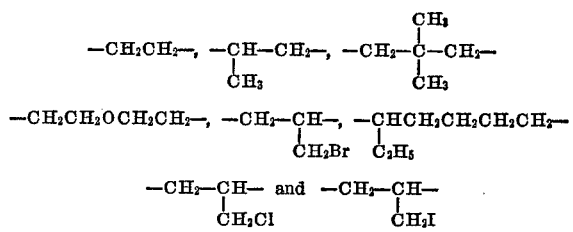

and polymerizable ethylenically unsaturated compound selected from the group consisting of styrene, methylmethacrylate, ethylmethacrylate, hydroxyethylmethacrylate, propylmethyacrylate, butylmethacrylate, methylacrylate, ethylacrylate, vinyl acetate, divinylbenzene, ethylene glycol dimethacrylate and mixtures thereof, the ratio by weight of said metal salt to other copolymerizable monomer being from about 1.1 to about 1:20.

11. A process for the preparation of a polymerizable mixture characterized by reacting a compound of the formula

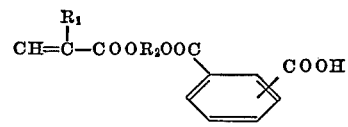

wherein $R_1$ is hydrogen or methyl and $R_2$ is an alkylene group or a monohaloalkylene group with an oxide or hydroxide of a bivalent metal in an inert solvent and mixing the metal salt so obtained, after removal of the solvent, with a polymerizable ethylenically unsaturated compound, the weight ratio of polymerizable metal salt to said polymerizable ethylenically unsaturated compound being from about 1:1 to about 1:20.

References Cited

UNITED STATES PATENTS 3,367,992   2/1968   Bearden _____ 260—475 N

HERBERT B. GUYNN, Primary Examiner

I. GLUCK, Assistant Examiner

U.S. Cl. X.R.

252—182; 260—78.5 R, 429.9, 435 R, 475 N, 515 P